(12) United States Patent
Thrasher

(10) Patent No.: US 11,345,381 B2
(45) Date of Patent: May 31, 2022

(54) MOBILE EXTRACTION ASSEMBLY

(71) Applicant: Danny Ray Thrasher, Bonne Terre, MO (US)

(72) Inventor: Danny Ray Thrasher, Bonne Terre, MO (US)

( * ) Notice: Subject to any disclaimer, the term of this patent is extended or adjusted under 35 U.S.C. 154(b) by 0 days.

(21) Appl. No.: 16/995,144

(22) Filed: Aug. 17, 2020

(65) Prior Publication Data

US 2022/0048548 A1   Feb. 17, 2022

(51) Int. Cl.
*B62B 1/22* (2006.01)
*B63C 13/00* (2006.01)
*B62B 1/26* (2006.01)

(52) U.S. Cl.
CPC ............. *B62B 1/22* (2013.01); *B62B 1/262* (2013.01); *B63C 13/00* (2013.01); *B62B 2202/403* (2013.01); *B62B 2203/72* (2013.01)

(58) Field of Classification Search
CPC .......... B62B 1/22; B62B 1/262; B62B 1/264; B62B 2202/403; B62B 2202/40; B62B 2203/72; B62B 2203/70; B63C 13/00; B60P 3/10; B60P 3/1033; B60P 3/40; B60P 9/00; B60P 1/43; A61G 1/06; A61G 1/007

See application file for complete search history.

(56) References Cited

U.S. PATENT DOCUMENTS

| 2,743,833 | A | | 5/1956 | Peterson | |
| 4,749,317 | A | * | 6/1988 | Daniel | B60P 3/08 D12/1 |
| 4,754,825 | A | | 7/1988 | Scheffer | |
| 5,154,564 | A | * | 10/1992 | Koch | B60P 3/1033 414/559 |
| 5,295,556 | A | | 3/1994 | Mullin | |
| 5,544,611 | A | * | 8/1996 | Fahringer, Sr. | B60P 3/1075 114/343 |
| 5,609,462 | A | * | 3/1997 | Reimer | B60P 3/1025 224/310 |
| 5,620,193 | A | | 4/1997 | Dschaak | |
| 6,604,749 | B2 | | 8/2003 | Woodbury | |
| 8,376,684 | B2 | * | 2/2013 | Juarez-Ortega | B60P 3/1025 414/500 |
| 9,986,731 | B2 | | 6/2018 | Mitchell et al. | |
| 9,987,964 | B1 | * | 6/2018 | Napier | B60P 3/1033 |
| 10,611,200 | B2 | | 4/2020 | Comeaux | |
| 2011/0181018 | A1 | * | 7/2011 | Bruneau | F24S 25/61 136/251 |

* cited by examiner

*Primary Examiner* — John D Walters
(74) *Attorney, Agent, or Firm* — The Small Patent Law Group LLC; Philip S. Hof

(57) ABSTRACT

A mobile extraction assembly includes a sled with a tow line secured to a front end of the sled. The mobile extraction assembly also includes a cart including a frame, a winch, and a pulley. The frame defines a track for receiving and supporting the sled. The winch is mounted to the frame underneath the track. The pulley is vertically disposed in line with or above the track, where the tow line is secured to the winch and routed around the pulley between the winch and the sled. This allows retraction of the tow line by the winch to draw the sled to the cart and onto the track of the cart in a direction towards the pulley.

20 Claims, 5 Drawing Sheets

MOBILE EXTRACTION ASSEMBLY

FIELD

Embodiments of the subject matter described herein relate to hand-propelled vehicles for extracting relatively heavy objects from wooded terrain.

BACKGROUND

Extracting heavy objects, such as deer or other animal carcasses, downed trees, rocks, and the like, from the woods can be a difficult and strenuous endeavor. The object or objects may be too heavy to comfortably manually drag or carry from the collection site of the object(s) in the woods to a location of a motorized vehicle, such as a pickup truck or all-terrain vehicle (ATV). Driving a motorized vehicle to the collection site in the woods may not be available in some situations due to regulations that prohibit motor vehicles on the property and/or the presence of dense trees and/or rocky terrain that block the ability of the motor vehicle to approach the object(s). Furthermore, even if a person is able to get the heavy object(s) to a motorized vehicle, the object(s) still have to be transferred to the vehicle, which often requires the manual exertion of a collection of people and/or additional equipment coupled to the vehicle to lift the object(s) onto the vehicle. There is a need for a manually-operated device that can enable extraction of relatively heavy objects from wooded environments onto motorized vehicles without requiring manual lifting or dragging, or outfitting a motorized vehicle with expensive equipment.

BRIEF DESCRIPTION

In one embodiment, a mobile extraction assembly includes a sled, a tow line, and a cart. The tow line is secured to a front end of the sled. The cart includes a frame, a winch, and a pulley. The frame defines a track for receiving and supporting the sled. The winch is mounted to the frame underneath the track. The pulley is vertically disposed in line with or above the track. The tow line is secured to the winch and routed around the pulley between the winch and the sled. Retraction of the tow line by the winch draws the sled to the cart and onto the track of the cart in a direction towards the pulley.

In one embodiment, a mobile extraction assembly includes a cart with a frame that defines a track for receiving and supporting a sled. The mobile extraction assembly also includes a winch mounted to the frame underneath the track. The winch is secured to a tow line that is configured to be coupled to a front end of the sled. Also, the mobile extraction assembly includes a pulley vertically disposed in line with or above the track. The tow line is routed from the winch around the pulley such that retraction of the tow line by the winch draws the sled to the cart and onto the track of the cart in a direction towards the pulley.

In one embodiment, a mobile extraction assembly includes a sled, a tow line, and a cart. The sled has a wedge-shaped front end with a tapered width. The tow line is secured to the front end of the sled. The cart includes a frame that defines a track for receiving and supporting the sled. The frame includes guide posts for laterally retaining the sled within the track. The cart also includes two coaxially-aligned wheels underneath the track for supporting the cart on ground. The cart has a claw member that is pivotably coupled to the frame and includes at least one hook at a distal end of the claw member for selectively anchoring the cart to the ground. Also included in the cart is a winch, a battery, and a pulley. The winch is mounted to the frame underneath the track and secured to the tow line. The battery is mounted to the frame underneath the track and electrically connected to the winch to power the winch. The pulley is vertically disposed in line with or above the track. The tow line is routed from the winch around the pulley such that retraction of the tow line by the winch draws the sled to the cart and onto the track of the cart in a direction towards the pulley.

BRIEF DESCRIPTION OF THE DRAWINGS

The subject matter described herein will be better understood from reading the following description of non-limiting embodiments, with reference to the attached drawings, wherein below.

DETAILED DESCRIPTION

Embodiments of the inventive subject matter described herein relate to a mobile extraction assembly for enabling a person to transport one or more relatively heavy objects from dense woods and other areas that may be difficult to access for motorized vehicles. The mobile extraction assembly is designed to be operated by a single person, without requiring the person to expel significant manual effort to pull or lift the heavy object(s). Once the mobile extraction assembly extracts the heavy object(s) from the dense woods, the mobile extraction assembly may interface with a motorized vehicle, such as a pickup truck or ATV, to enable the motorized vehicle to transport the heavy objects and the mobile extraction assembly for longer distances. The mobile extraction assembly may remedy many problems currently encountered when hunting, clearing brush, obtaining firewood, and other outdoor tasks, such as a difficulty to transport heavy objects (e.g., animal carcasses, wood, etc.) from dense woods to a location of a motor vehicle and a difficulty to lift the heavy objects onto the motor vehicle, which may require expensive equipment that attaches to the vehicle.

Figure 1:
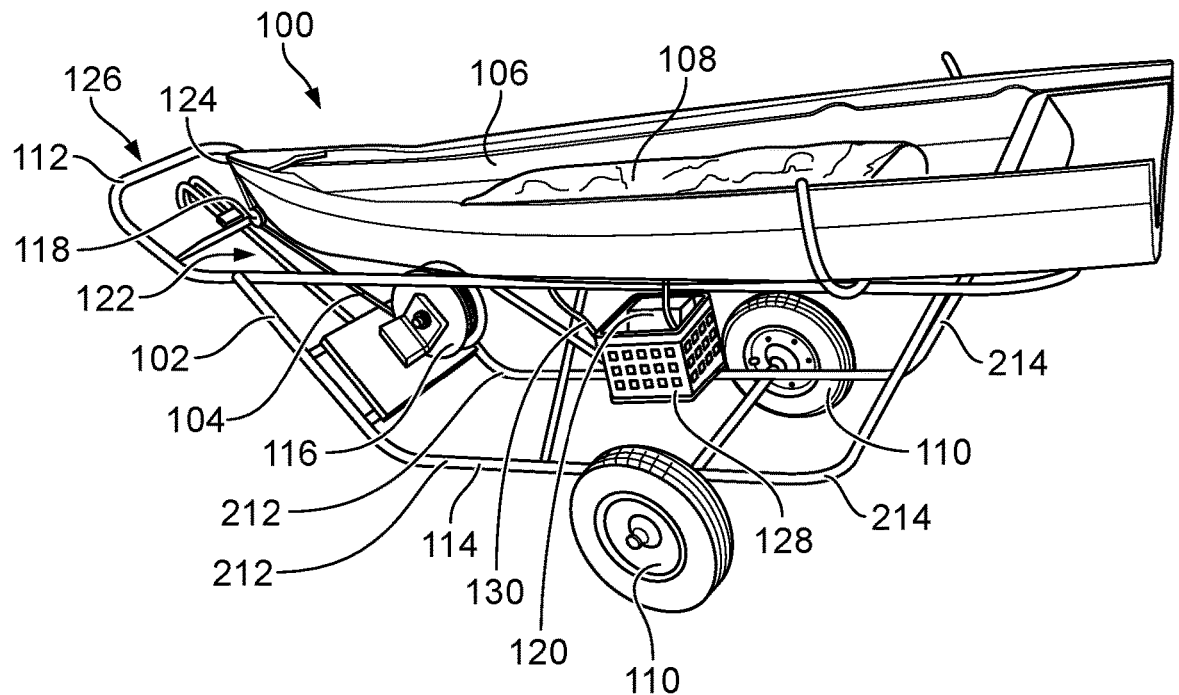
FIG. 1 illustrates a rear three-quarter view of a mobile extraction assembly according to an embodiment.

FIG. 1 illustrates a rear three-quarter view of a mobile extraction assembly 100 according to an embodiment. FIG.

2 illustrates a front three-quarter view of the mobile extraction assembly 100 shown in FIG. 1. The mobile extraction assembly 100 includes a cart 102, a tow line 104, and a sled 106. The sled 106 is tethered to the cart 102 via the tow line 104. The sled 106 is disposed on and supported by the cart 102 in the illustrated embodiment. The sled 106 is configured to contain a load 108. The load 108 may be game (e.g., one or more animal carcasses), wood (e.g., fallen tree or branch, firewood, brush, etc.), rocks, earth (e.g., dirt), or the like. In a non-limiting example application, the mobile extraction assembly 100 can be used to transport game when hunting. The cart 102 has two wheels 110 and a handlebar 112. The cart 102 can be hand-propelled by an operator (e.g., a person) by grasping the handlebar 112. The majority of the weight of the load 108, the sled 106, the tow line 104, and the cart 102 is supported by the wheels 110 which engage the ground. The wheels 110 enable the cart 102 to roll along the ground. For example, an operator can move the mobile extraction assembly 100 similar to manipulating other types of carts, such as a wheelbarrow. As described in more detail herein, the tow line 104 is used to load the sled 106 onto the cart 102 into the lifted position shown in FIGS. 1 and 2, without requiring manual effort to lift the sled 106 and/or the load 108.

The cart 102 includes a frame 114, the wheels 110, the handlebar 112, a winch 116, a pulley 118, and a power source 120. The wheels 110, winch 116, pulley 118, and power source 120 are mounted to the frame 114. The handlebar 112 may be an integral component of the frame 114. The frame 114 defines a track 122 for receiving and supporting the sled 106. The winch 116 is mounted to the frame 114 underneath the track 122, such that when the sled 106 is in the lifted position on the track 122 the sled 106 is disposed directly above the winch 116. For example, a vertical line (parallel to the force of gravity) extending from the winch 116 would intersect the sled 106. The pulley 118 is mounted to the frame 114 vertically in line with or above the track 122. The pulley 118 is disposed above the winch 116 and closer to a front 126 of the cart 102 than the winch 116. The pulley 118 may be located proximate to the handlebar 112 at the front 126.

The tow line 104 is secured to the winch 116 and extends from the winch 116, The tow line 104 routes around the pulley 118 to the sled 106. The pulley 118 is disposed between the winch 116 and the sled 106 along the length of the tow line 104. The tow line 104 is secured to a front end 124 of the sled 106. The winch 116 is operated to wind or reel the tow line 104, which retracts the tow line 104. Retraction of the tow line 104 pulls or draws the sled 106 towards the pulley 118. When the sled 106 is separated from the cart 102, retracting the tow line 104 pulls the sled 106 towards the card 102. As the sled 106 reaches the cart 102, additional retraction of the tow line 104 draws the sled 106 onto the track 122 of the cart 102 towards the pulley 118.

The winch 116 has a motor that is electrically connected to the power source 120, such that the power source 120 powers the winch 116. The power source 120 may be electrically connected to the winch 116 via one or more electrical wires, cables, flexible conductor strips, or the like. The power source 120 in the illustrated embodiment is a battery, such as a lead acid battery, a lithium ion battery, or the like. The power source 120 may be mounted to the frame 114 underneath the track 122. In the illustrated embodiment, the power source 120 is disposed in a housing 128 that is movably-mounted to the frame 114 to reduce impact forces exerted on the power source 120 during movement of the mobile extraction assembly 100. For example, the housing 128 may be suspended from the frame 114 by flexible tether lines 130, which enable the housing 128 and power source 120 therein to sway. The housing 128 in a non-limiting example can be a basket.

Figure 2:
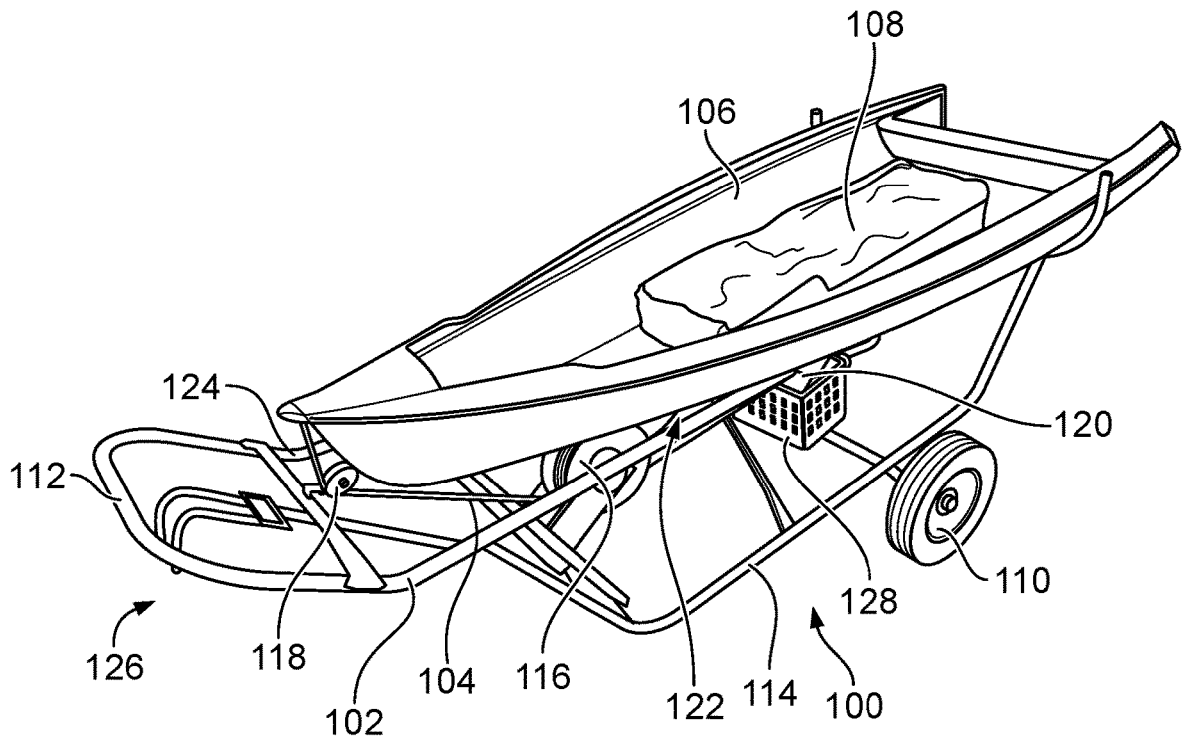
FIG. 2 illustrates a front three-quarter view of the mobile extraction assembly shown in FIG. 1.

With particular reference to FIG. 2, the front end 124 of the sled 106 is shaped like a wedge with a tapered width that comes to a pointy nose. This shape may be helpful for navigating the sled 106 along rough terrain between trees and other obstructions without snagging. The sled 106 may resemble a small boat, such as the front of a canoe. The sled 106 may be constructed of a durable material that can withstand being dragged along the ground and knocked into obstructions, such as a polymer material. Alternatively, the sled 106 can be composed of metal, wood, or the like.

Figure 3:
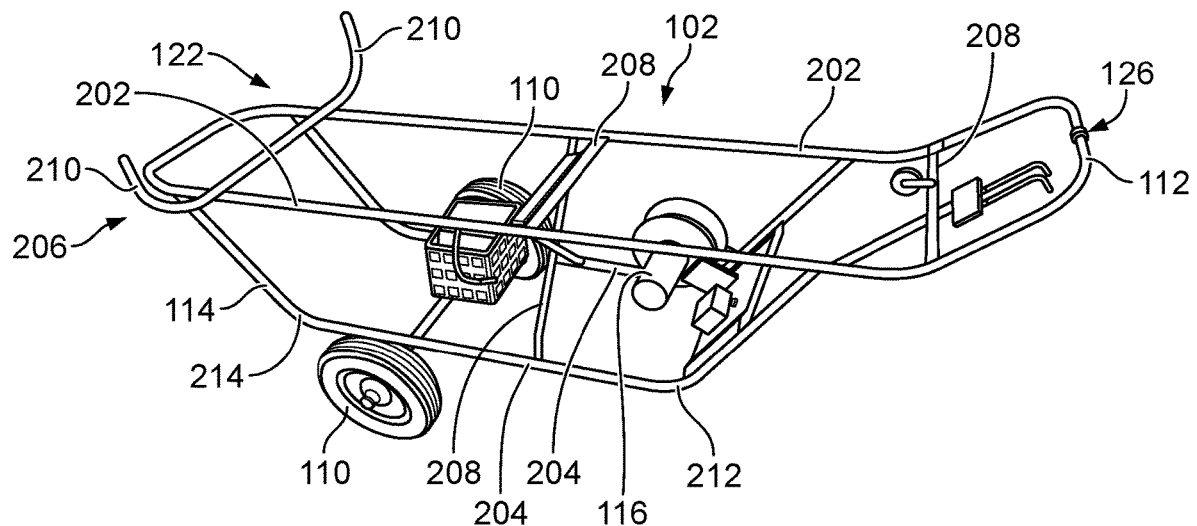
FIG. 3 is a side perspective view of a cart of the mobile extraction assembly according to the embodiment shown in FIGS. 1 and 2.
Figure 4:
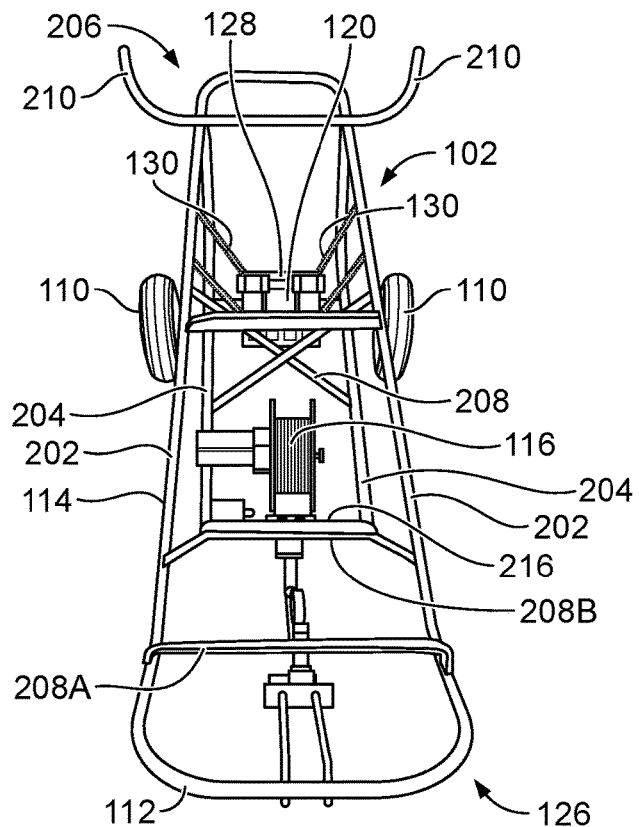
FIG. 4 is a front perspective view of the cart of the mobile extraction assembly shown in FIGS. 1 through 3.

FIG. 3 is a side perspective view of the cart 102 of the mobile extraction assembly 100 according to the embodiment shown in FIGS. 1 and 2. FIG. 4 is a front perspective view of the cart 102 of the mobile extraction assembly 100. The frame 114 is defined by multiple interconnected frame members. The frame 114 may be composed of one or more metals, such as aluminum, steel, or the like, wood, or a composite.

The frame members include at least two elongated upper frame members 202 and at least two elongated lower frame members 204. The elongated upper frame members 202 extend the length of the cart 102 from the front 126 to a rear 206 of the cart 102. Two elongated upper frame members 202 are shown in FIGS. 3 and 4. The elongated upper frame members 202 may define at least a portion of the track 122 such that the sled 106 (shown in FIGS. 1 and 2) slides along the elongated upper frame members 202. The elongated upper frame members 202 may be integrally connected to each other at the handlebar 112, such that a single, unitary rod defines the handlebar 112 and both upper frame members 202. The frame members also include cross-members 208 that extend between and interconnect the elongated upper frame members 202 and the elongated lower frame members 204 to provide structural rigidity to the cart 102.

In the illustrated embodiment, the cart 102 includes guide posts 210 which also represent frame members of the frame 114. The guide posts 210 are disposed proximate to the rear 206 of the cart 102. The guide posts 210 project at least partially vertically above the elongated upper frame members 202. The guide posts 210 are designed to define lateral edges of the track 122, such that the sled 106 is received between the guide posts 210 and the guide posts 210 laterally retain the sled 106 within the track 122. In an embodiment, the elongated upper frame members 202 may define a floor of the track 122 along which the sled 106 rests and slides, and the guide posts 210 define the lateral edges of the track 122 that can mechanically abut against sides of the sled 106 to prohibit the sled 106 from falling off the cart 102.

The elongated lower frame members 204 are contoured to each include an elbow bend 212 and a knee bend 214 along the length of the respective frame member 204. The elongated lower frame members 204 may be parallel to each other such that the elbow bends 212 and the knee bends 214 align. In the illustrated embodiment, the elbow and knee bends 212, 214 are curved angles that may each be obtuse (e.g., greater than 90 degrees). In an embodiment, each of the bends 212, 214 may be greater than 90 degrees and less than 135 degrees. The elbow and knee bends 212, 214 are also labeled in FIG. 1 for reference.

The wheels 110 on the cart 102 are mounted to the frame 114 at a location between the elbow bends 212 and the knee bends 214. The wheels 110 optionally may be directly mounted to the elongated lower frame members 204 or may be mounted to another frame member connected to the elongated lower frame members 204. The wheels 110 may be constructed of a durable material, such as rubber, to enable the mobile extraction assembly 100 to traverse through difficult terrain, such as woodland. The wheels 100 may be inflatable. In the illustrated embodiment, the cart 102 has two wheels 110 that are co-axially aligned, such that an axle of the first wheel 110 is collinear with an axle of the second wheel 110. Because, the only two wheels 110 are coaxial, the cart 102 can pivot about the set of wheels 110 frontward and rearward. In the illustrated position in FIGS. 3 and 4, the cart 102 is pivoted frontward and the elbow bends 212 of the elongated lower frame members 204 physically contact the ground (to block additional rotation). The front-pivoted position of the cart 102 in FIGS. 3 and 4 is referred to as an upright orientation. The knee bends 214 are lifted off the ground in the upright orientation. When the cart 102 pivots rearward about the wheels 110, the knee bends 214 physically contact the ground (to block additional rotation). The cart 102 is referred to herein as being in a decline orientation when the knee bends 214 contact the ground. The elbow bends 212 are lifted off the ground in the decline orientation. In an embodiment, the wheels 110 (e.g., wheelset) are disposed more proximate to the knee bends 214 than the elbow bends 212. Due to this wheel placement and the mounted positions of other components (e.g., the winch 116), the cart 102 is biased towards being in the upright orientation when at rest as shown in FIGS. 3 and 4. The operator can manually lift up on the handlebar 112 to raise the elbow bends 212 off the ground (while maintaining the knee bends 214 off the ground) for hand-propelling the cart 102, similar to the operation of a wheelbarrow.

Referring now particularly to FIG. 4, in the illustrated embodiment the pulley 118 is secured to a first cross-member 208A that is proximate to the handlebar 112. The first cross-member 208A extends between and connects to the elongated upper frame members 202. The winch 116 is mounted on a base plate 216 that is secured to at least a second cross-member 208B. The second cross-member 208B is secured to and extends between the elongated lower frame members 204 in front of the elbow bends 212. The housing 128 that holds the power source 120 may be tethered via the flexible tether lines 130 to the elongated upper frame members 202.

Figure 5:
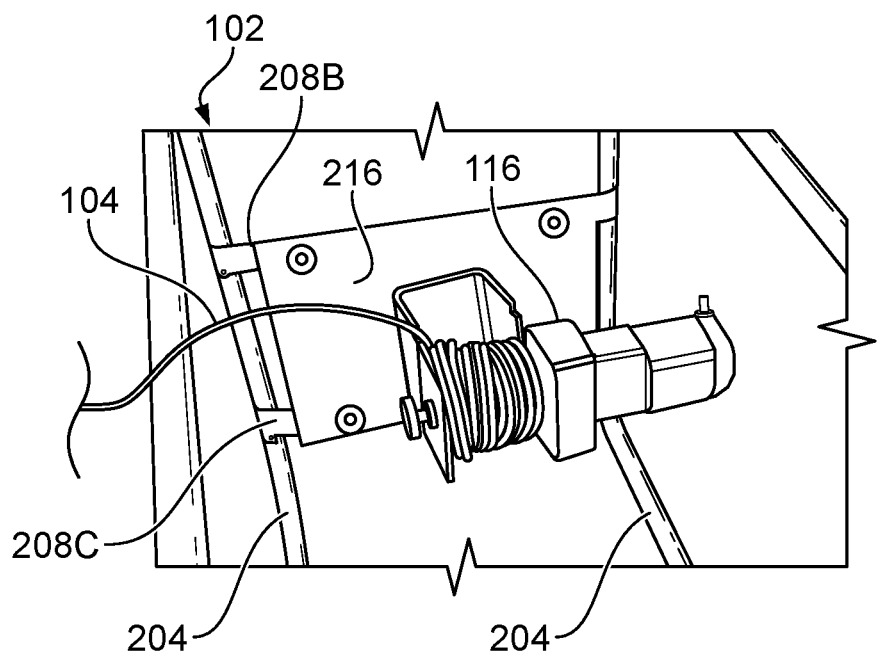
FIG. 5 is a close-up view of a winch on the cart according to an embodiment.

FIG. 5 is a close-up view of the winch 116 on the cart 102 according to an embodiment. The winch 116 is securely fastened to the base plate 216. The base plate 216 is mounted to the second cross-member 208B and a third cross-member 208C which both extend between and connect to the elongated lower frame members 204. The winch 116 spools the tow line 104. The tow line 104 can be a steel cable, a chain, a rope, a high strength fiber composite, or the like.

Figure 6:
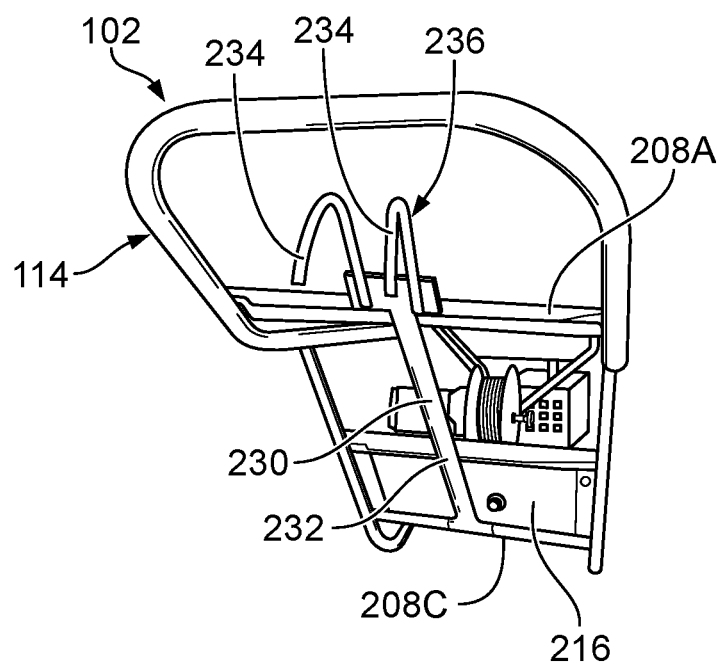
FIG. 6 is a front view of the cart according to an embodiment.

FIG. 6 is a front view of the cart 102 according to an embodiment. The cart 102 may include a claw member 230 that is pivotably coupled to the frame 114. The claw member 230 includes an arm 232 and at least one hook 234. The claw member 230 has two hooks 234 in the illustrated embodiment. The hoods 234 are mounted to the arm 232 and located at a distal end 236 of the claw member 230. The arm 232 couples to the frame 114. In the illustrated embodiment, the arm 232 is pivotably coupled to the third cross-member 208C and/or the base plate 216. The claw member 230 is designed for selectively anchoring the cart 102 to the ground. The claw member 230 is secured in a stowed position in FIG. 6, such that the claw member 230 is raised and secured to the first cross-member 208A. In an embodiment, the claw member 230 can be released from the first cross-member 208A to swing downward about the coupling location to enable the hooks 234 to embed into the ground. Embedding the hooks 234 into the ground provides an anchor to hold the cart 102 in place while the winch 116 draws the sled 102 towards the cart 102.

Figure 7:
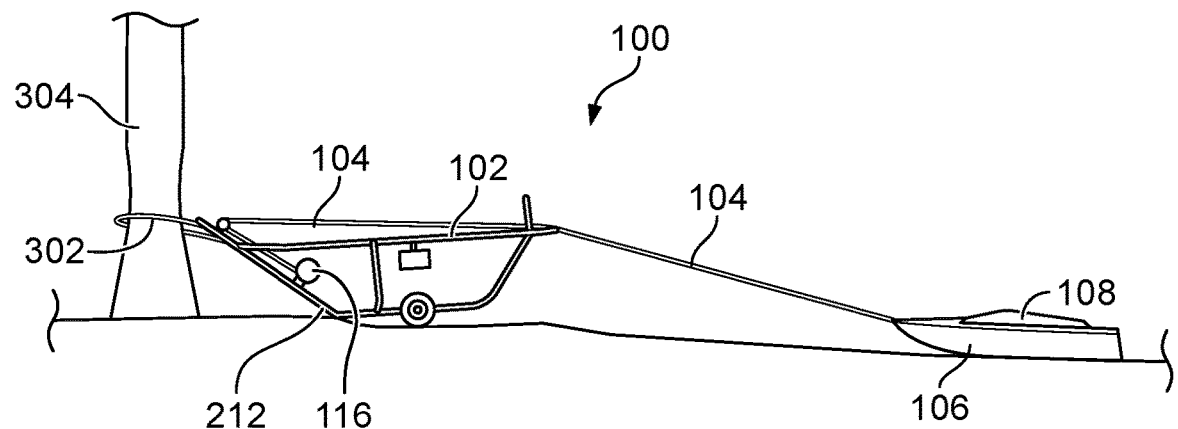
FIG. 7 illustrates the mobile extraction assembly with a sled thereof disposed remote from the cart during an extraction operation.

The following description relates to example use cases for the mobile extraction assembly 100 to extract a heavy object or objects and then transport the heavy object(s). The uses described herein are some possible uses, but are not intended to limit or exclude other potential uses of the mobile extraction assembly 100. FIG. 7 illustrates the mobile extraction assembly 100 with the sled 106 disposed remote from the cart 102 during an extraction operation. In use, an operator identifies the object or objects 108 to be extracted. In an example, the object 108 may be a deer carcass that is disposed in a densely wooded area. The operator may hand-propel the mobile extraction assembly 100 within a designated range of the object 108, such as 200 feet, 100 feet, or the like. The operation removes the sled 106 from the cart 102 and secures the cart 102 in place. In one embodiment, the cart 102 can be secured by using a strap 302 to tie the cart 102 to a tree 304 or other stable object. The operator then carries or drags the empty sled 106 to the location of the object 108 to be extracted. The sled 106 may be pre-fastened to the tow line 104, such that the tow line 104 extends the distance between the cart 102 and the sled 106. Alternatively, the order may be modified such that the tow line 104 is secured to the sled 106 only after moving the sled 106 to the object 108. The operator lifts or drags the object 108 onto the sled 106. The sled 106 is low profile and low to the ground, to reduce the height that the object 108 has to be lifted. Optionally, a lever or other tool can assist the operator in moving the object 108 onto the sled 106.

After loading the object 108 onto the sled 106, the operator activates the winch 116, which begins to reel in the tow line 104, pulling the loaded sled 106 towards the cart 102. The operator may activate the winch 116 by flipping a switch or clicking a button. Optionally, the winch 116 may be controlled remotely via a handheld device. The cart 102 remains relatively stationary during the extraction because it is strapped to the tree 304. The wedge-shaped sled 106 is configured to navigate the terrain without snagging, such that the operator should not have to intervene to steer or guide the sled 106 unless the sled 106 gets stuck. As shown in FIG. 7, the cart 102 is in the upright orientation, similar to FIGS. 1 through 4.

Figure 8:
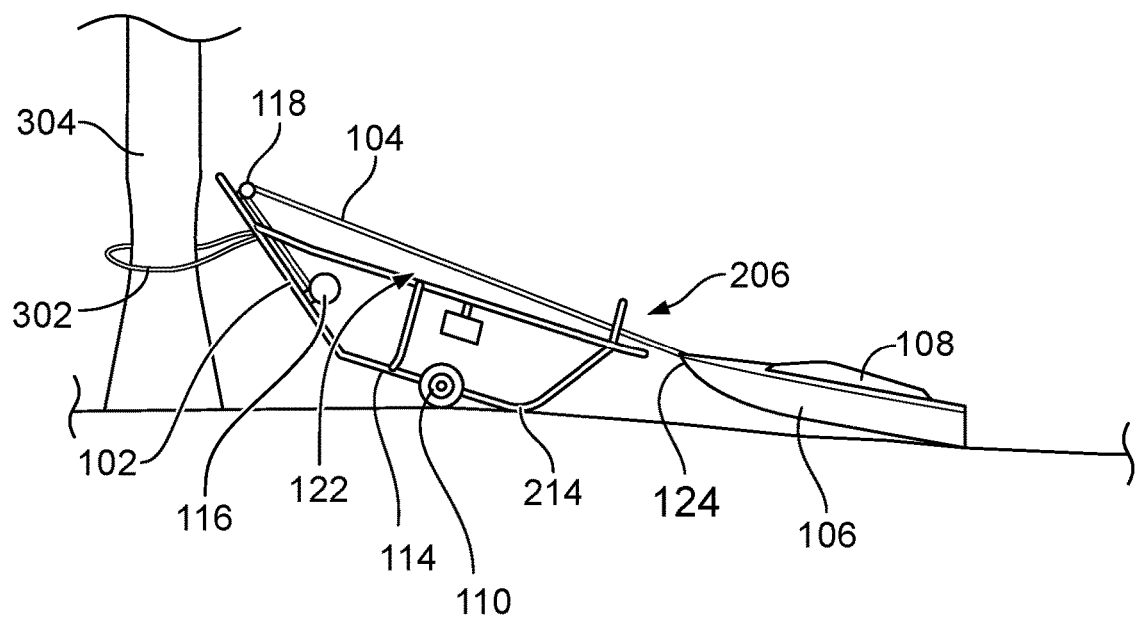
FIG. 8 illustrates the mobile extraction assembly at a subsequent stage of the extraction operation relative to FIG. 7.

FIG. 8 illustrates the mobile extraction assembly 100 at a subsequent stage of the extraction operation relative to FIG. 7. The loaded sled 106 is disposed proximate to the cart 102 in FIG. 8. In an embodiment, as the sled 106 approaches the cart 102, the cart 102 may automatically tilt or pivot about the wheels 110 to the decline orientation, such that the knee bends 214 of the frame 114 contact the ground. In the decline orientation shown in FIG. 8, the track 122 of the cart 102 is angled similar to a ramp for receiving the sled 106. The winch 116 continues to reel the tow line 104, which lifts the front end 124 of the sled 106 off the ground onto the rear 206 of the cart 102. Further winding of the tow line 104 pulls the front end 124 of the sled 106 along the track 122 towards the pulley 118 until the entire sled 106 is off the ground and on the cart 102. In an embodiment, the cart 102 may automatically tilt or pivot about the wheels 110 back to the incline orientation after the sled 106 is fully loaded onto the cart 102. For example, the added weight of the sled 106 and the object(s) 108 may eventually tip the cart 102 onto the elbow bends 212 again (as shown in FIG. 7) once a sufficient amount of weight is disposed in front of the wheels 110. The operator may not be required to exert any manual effort, or very little manual effort, during this stage of loading the sled 106 onto the cart 102.

Figure 9:
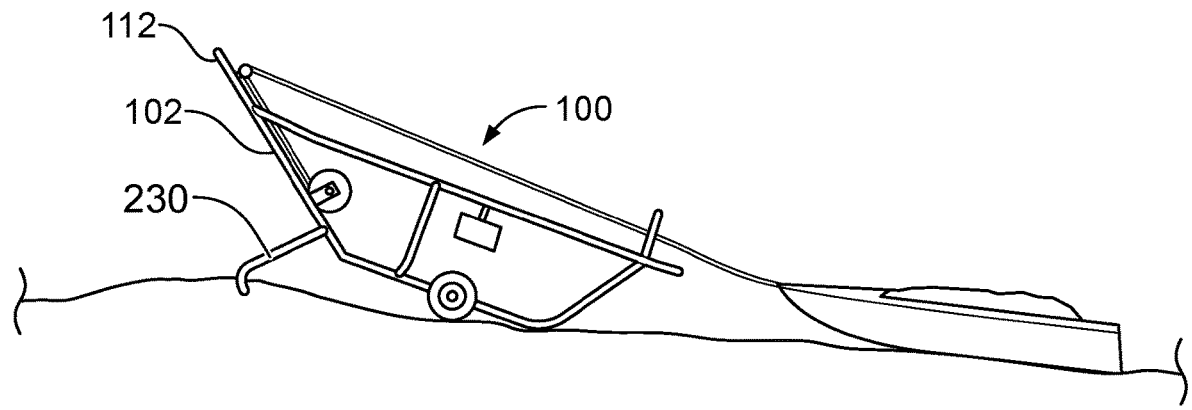
FIG. 9 illustrates the mobile extraction assembly during the extraction operation according to an alternative use case in which a claw member of the cart is embedded into the ground to secure the cart in place.

After the sled 106 with the object(s) 108 is loaded onto the cart 102, the operator can release the straps 302 from the tree 304. The claw member 230 can be used instead of, or in addition to, the straps 302 to secure the cart 102 in place during the extraction operation. FIG. 9 illustrates the mobile extraction assembly 100 during the extraction operation according to an alternative use case in which the claw member 230 of the cart 102 is embedded into the ground to secure the cart 102 in place. Because the claw member 230 is pivotable relative to the cart 102, the claw member 230 may not interfere with the automatic pivoting of the cart 102 between the upright and decline orientations as described above with reference to FIGS. 7 and 8.

Figure 10:
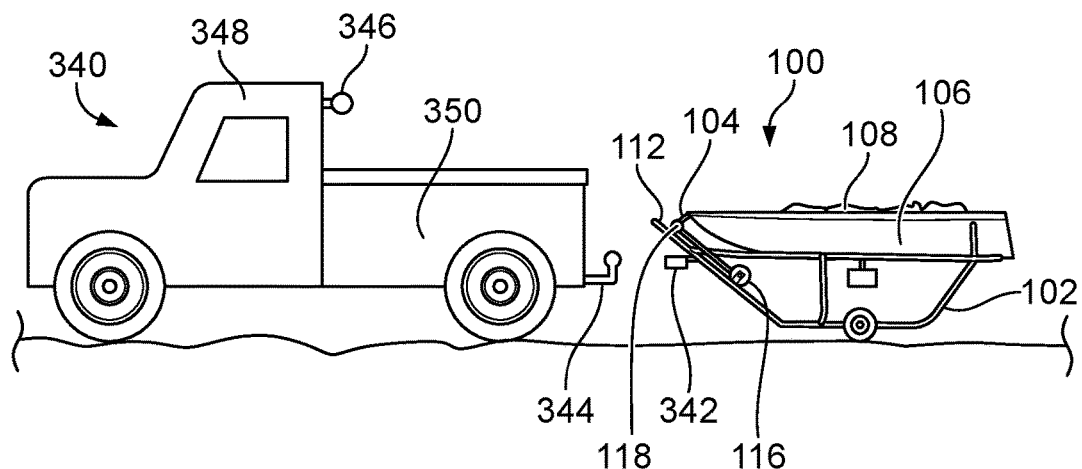
FIG. 10 illustrates the mobile extraction assembly poised for coupling to a truck according to an embodiment.

The operator now has several options for transporting the mobile extraction assembly 100 with the object(s) 108. First, the operator can grasp the handlebar 112 and manually walk the mobile extraction assembly 100. Second, the operator can affix the cart 102 to a motor vehicle. FIG. 10 illustrates the mobile extraction assembly 100 poised for coupling to a truck 340 according to an embodiment. In an embodiment, the cart 102 of the mobile extraction assembly 100 may have a tow hitch coupler 342 at the front of the cart 102. The coupler 342 is designed to releasably connect to a tow hitch 344 on the truck 340, such that the truck 340 can tow the mobile extraction assembly 100.

The mobile extraction assembly 100 can also be used with a pulley 346 mounted on the truck 340, such as at the back of the cab 348, for lifting the sled 106 with the object(s) 108 fully onto the bed 350 of the truck 340. For example, the operator can get the mobile extraction assembly 100 close to the rear of the truck 340 as shown in FIG. 10. Then, the operator can disconnect the tow line 104 from the sled 106 and the pulley 118, and wrap the tow line 104 to extend from the winch 116 around the pulley 346 mounted on the truck 340. The operator then reconnects the tow line 104 to the sled 106 and activates the winch 116. The winch 116 now draws the tow line 104 which pulls the sled 106 towards the pulley 346. The sled 106 may be pulled over the handlebar 112 onto the bed 350 of the truck 340, without requiring any or only minimal manual effort. Once the sled 106 and object(s) 108 are on the bed 350, the operator can transport the object(s) 108. The operator can either connect the cart 102 to the tow hitch 344 to take the cart 102 along, or leave the cart 102 behind.

In one embodiment, a mobile extraction assembly may include a sled, a tow line secured to a front end of the sled, and a cart. The cart may include a frame, a winch, and a pulley. The frame may define a track for receiving and supporting the sled. The winch may be mounted to the frame underneath the track. The pulley may be vertically disposed in line with or above the track. The tow line may be secured to the winch and routed around the pulley between the winch and the sled such that retraction of the tow line by the winch draws the sled to the cart and onto the track of the cart in a direction towards the pulley.

Optionally, the cart may include two coaxially-aligned wheels for rolling the cart along the ground. Optionally, the cart may include a battery mounted to the frame underneath the track. The battery may be electrically connected to the winch to power the winch. Optionally, the battery may be disposed in a housing that is suspended from the frame by flexible tether lines. Optionally, the front end of the sled may have a tapered width. Optionally, the cart may include a claw member that is pivotably coupled to the frame. The claw member may include at least one hook at a distal end of the claw member for selectively anchoring the cart to the ground. Optionally, the frame may include guide posts for laterally retaining the sled within the track. Optionally, the winch may be operated to draw the sled carrying a load to the cart and onto the track. The cart may be designed to automatically pivot from a decline orientation, in which a rear of the cart provides a ramp for receiving the sled, to an upright orientation, in which the rear of the cart does not provide the ramp, as the sled is pulled along the track towards the pulley.

Optionally, the frame may include two lower frame members that each includes an elbow bend and a knee bend, the cart including two coaxially-aligned wheels mounted to the lower frame members along a length of the frame between the respective elbow bends and knee bends. The knee bends may be configured to contact ground when the cart is in the decline orientation and the elbow bends may be configured to contact the ground when the cart is in the upright orientation. Optionally, the cart has a handlebar at a front of the cart for manual manipulation of the cart. Optionally, the cart has a tow hitch at a front of the cart for coupling the cart to a vehicle.

In one embodiment, a mobile extraction assembly may include a cart. The cart may include a frame that defines a track for receiving and supporting a sled. The cart may also include a winch mounted to the frame underneath the track. The winch may be secured to a tow line that is configured to be coupled to a front end of the sled. The cart may also include a pulley vertically disposed in line with or above the track. The tow line may be routed from the winch around the pulley such that retraction of the tow line by the winch draws the sled to the cart and onto the track of the cart in a direction towards the pulley.

Optionally, the winch is operated to draw the sled carrying a load to the cart and onto the track. The cart may be designed to automatically pivot from a decline orientation, in which a rear of the cart provides a ramp for receiving the sled, to an upright orientation, in which the rear of the cart does not provide the ramp, as the sled is pulled along the track towards the pulley. Optionally, the frame may include two lower frame members that each includes an elbow bend and a knee bend. The cart may include two coaxially-aligned wheels mounted to the lower frame members along a length of the frame between the respective elbow bends and knee bends. The knee bends may be configured to contact the ground when the cart is in the decline orientation and the elbow bends may be configured to contact the ground when the cart is in the upright orientation. Optionally, the cart may include two coaxially-aligned wheels for rolling the cart along the ground. Optionally, the cart may include a battery mounted to the frame underneath the track. The battery may be electrically connected to the winch to power the winch. Optionally, the battery may be disposed in a housing that is suspended from the frame by flexible tether lines. Optionally, the cart may include a claw member that is pivotably coupled to the frame. The claw member may include at least one hook at a distal end of the claw member for selectively anchoring the cart to the ground. Optionally, the frame may include guide posts for laterally retaining the sled within the track.

In one embodiment, a mobile extraction assembly includes a sled that has a wedge-shaped front end with a tapered width, a tow line secured to the front end of the sled and a cart. The cart may include a frame that defines a track for receiving and supporting the sled. The frame may include guide posts for laterally retaining the sled within the track and two coaxially-aligned wheels underneath the track for supporting the cart on ground. The frame may also include a claw member pivotably coupled to the frame. The claw member may include at least one hook at a distal end of the claw member for selectively anchoring the cart to the ground, a winch mounted to the frame underneath the track and secured to the tow line, a battery mounted to the frame underneath the track and electrically connected to the winch to power the winch, and a pulley. The pulley may be vertically disposed in line with or above the track. The tow line may be routed from the winch around the pulley such that retraction of the tow line by the winch draws the sled to the cart and onto the track of the cart in a direction towards the pulley.

The above description is illustrative and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Other embodiments may be apparent to one of ordinary skill in the art upon reviewing the above description. The scope of the inventive subject matter should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure. And, as used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A mobile extraction assembly comprising:
a sled;
a tow line secured to a front end of the sled; and
a cart including a frame, a winch, two coaxially-aligned wheels, and a pulley, the frame defines a track for receiving and supporting the sled, the winch mounted to the frame underneath the track, the two coaxially-aligned wheels mounted to the frame for rolling the cart along ground, the pulley vertically disposed in line with or above the track, wherein the tow line is secured to the winch and routed around the pulley between the winch and the sled such that retraction of the tow line by the winch draws the sled to the cart and onto the track of the cart in a direction towards the pulley,
wherein, as the winch draws the sled carrying a load along the track towards the pulley, the frame automatically pivots about the two coaxially-aligned wheels from a decline orientation, in which a rear of the cart contacts the ground and provides a ramp for receiving the sled, to an upright orientation, in which the rear of the cart is lifted off the ground and does not provide the ramp.

2. The mobile extraction assembly of claim 1, wherein the cart includes a battery mounted to the frame underneath the track, the battery electrically connected to the winch to power the winch.

3. The mobile extraction assembly of claim 2, wherein the battery is disposed in a housing that is suspended from the frame by flexible tether lines.

4. The mobile extraction assembly of claim 1, wherein the front end of the sled has a tapered width.

5. The mobile extraction assembly of claim 1, wherein the frame includes guide posts for laterally retaining the sled within the track.

6. The mobile extraction assembly of claim 1, wherein the frame includes two lower frame members that each includes an elbow bend and a knee bend, the two coaxially-aligned wheels mounted to the lower frame members along a length of the frame between the respective elbow bends and knee bends, wherein the knee bends are configured to contact the ground when the cart is in the decline orientation and the elbow bends are configured to contact the ground when the cart is in the upright orientation.

7. The mobile extraction assembly of claim 1, wherein the cart has a handlebar at a front of the cart for manual manipulation of the cart.

8. The mobile extraction assembly of claim 1, wherein the cart has a tow hitch coupler at a front of the cart for coupling the cart to a vehicle.

9. The mobile extraction assembly of claim 1, wherein the frame automatically pivots about the two coaxially-aligned wheels as the winch draws the sled carrying the load along the track towards the pulley based on a weight distribution of the sled carrying the load relative to a location of the two coaxially-aligned wheels.

10. A mobile extraction assembly comprising:
a sled;
a tow line secured to a front end of the sled; and
a cart including a frame, a winch, a claw member, and a pulley, the frame defines a track for receiving and supporting the sled, the winch mounted to the frame underneath the track, the claw member pivotably coupled to the frame and including at least one hook at a distal end of the claw member for selectively anchoring the cart to ground, the pulley vertically disposed in line with or above the track, wherein the tow line is secured to the winch and routed around the pulley between the winch and the sled such that retraction of the tow line by the winch draws the sled to the cart and onto the track of the cart in a direction towards the pulley.

11. The mobile extraction assembly of claim 10, wherein the cart includes the two coaxially-aligned wheels mounted to the frame for rolling the cart along ground, wherein, as the winch draws the sled carrying a load along the track towards the pulley, the frame automatically pivots about the two coaxially-aligned wheels from a decline orientation, in which a rear of the cart contacts the ground and provides a ramp for receiving the sled, to an upright orientation, in which the rear of the cart is lifted off the ground and does not provide the ramp.

12. The mobile extraction assembly of claim 11, wherein the frame automatically pivots about the two coaxially-aligned wheels as the winch draws the sled carrying the load along the track towards the pulley based on a weight distribution of the sled carrying the load relative to a location of the two coaxially-aligned wheels.

13. The mobile extraction assembly of claim 10, wherein the frame includes two lower frame members below the track that each includes a respective elbow bend and a respective knee bend, and the cart further comprises two coaxially-aligned wheels for rolling the cart along ground, the two coaxially-aligned wheels mounted to the lower frame members along a length of the frame that is between the elbow bends and knee bends, wherein the frame is pivotable about the tow coaxially-aligned wheels such that the knee bends contact the ground when the cart is in a decline orientation and the elbow bends contact the ground when the cart is in an upright orientation.

14. A mobile extraction assembly comprising:
a cart comprising:
a frame that defines a track for receiving and supporting a sled, the frame including two lower frame members below the track that each includes a respective elbow bend and a respective knee bend;
two coaxially-aligned wheels for rolling the cart along ground, the two coaxially-aligned wheels mounted to the lower frame members along a length of the frame that is between the elbow bends and knee bends, wherein the frame is pivotable about the tow coaxially-aligned wheels such that the knee bends contact the ground when the cart is in a decline orientation and the elbow bends contact the ground when the cart is in an upright orientation;
a winch mounted to the frame underneath the track, the winch secured to a tow line that is configured to be coupled to a front end of the sled; and
a pulley vertically disposed in line with or above the track, wherein the tow line is routed from the winch around the pulley such that retraction of the tow line by the winch draws the sled to the cart and onto the track of the cart in a direction towards the pulley.

15. The mobile extraction assembly of claim 14, wherein, as the winch is operated to draw the sled carrying a load onto the track and along the track towards the pulley, the frame automatically pivots from the decline orientation, in which a rear of the cart provides a ramp for receiving the sled, to the upright orientation, in which the rear of the cart does not provide the ramp.

16. The mobile extraction assembly of claim 14, wherein the cart includes a battery mounted to the frame underneath the track, the battery electrically connected to the winch to power the winch.

17. The mobile extraction assembly of claim 16, wherein the battery is disposed in a housing that is suspended from the frame by flexible tether lines.

18. The mobile extraction assembly of claim 14, wherein the cart includes a claw member that is pivotably coupled to the frame, the claw member including at least one hook at a distal end of the claw member for selectively anchoring the cart to ground.

19. The mobile extraction assembly of claim 14, wherein the frame includes guide posts for laterally retaining the sled within the track.

20. A mobile extraction assembly comprising:
a sled that has a wedge-shaped front end with a tapered width;
a tow line secured to the front end of the sled; and
a cart comprising:
a frame that defines a track for receiving and supporting the sled, the frame including guide posts for laterally retaining the sled within the track,
two coaxially-aligned wheels underneath the track for supporting the cart on ground,
a claw member pivotably coupled to the frame, the claw member including at least one hook at a distal end of the claw member for selectively anchoring the cart to the ground;
a winch mounted to the frame underneath the track and secured to the tow line,
a battery mounted to the frame underneath the track and electrically connected to the winch to power the winch; and
a pulley vertically disposed in line with or above the track, wherein the tow line is routed from the winch around the pulley such that retraction of the tow line by the winch draws the sled to the cart and onto the track of the cart in a direction towards the pulley.

* * * * *